D. M. MYERS.
HAY AND GRAIN LOADER.
APPLICATION FILED MAR. 13, 1911.
1,019,344.
Patented Mar. 5, 1912.
5 SHEETS—SHEET 1.
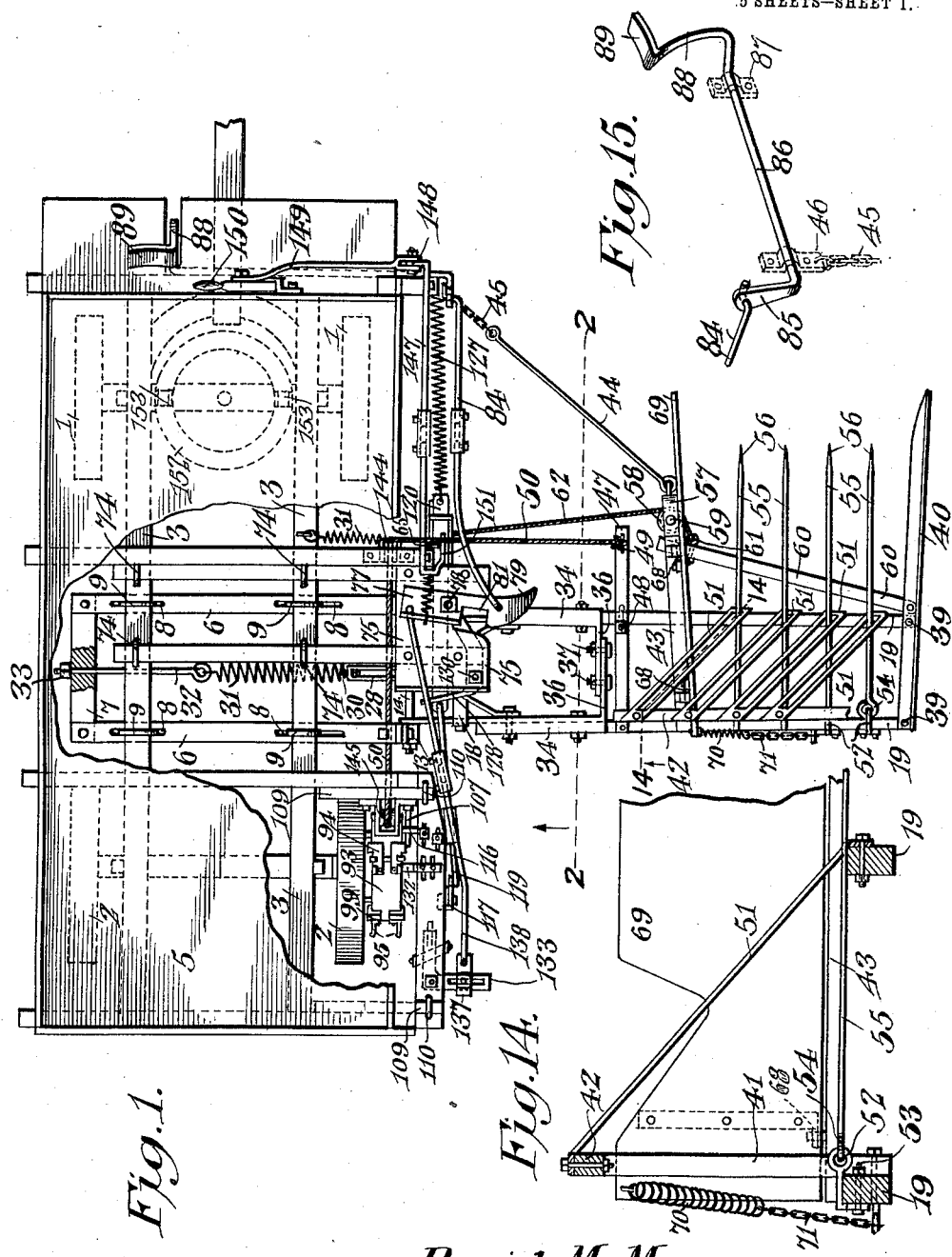
WITNESSES
David M. Myers, INVENTOR
BY
ATTORNEY D. M. MYERS.
HAY AND GRAIN LOADER.
APPLICATION FILED MAR. 13, 1911.
1,019,344.
Patented Mar. 5, 1912.
5 SHEETS—SHEET 2.
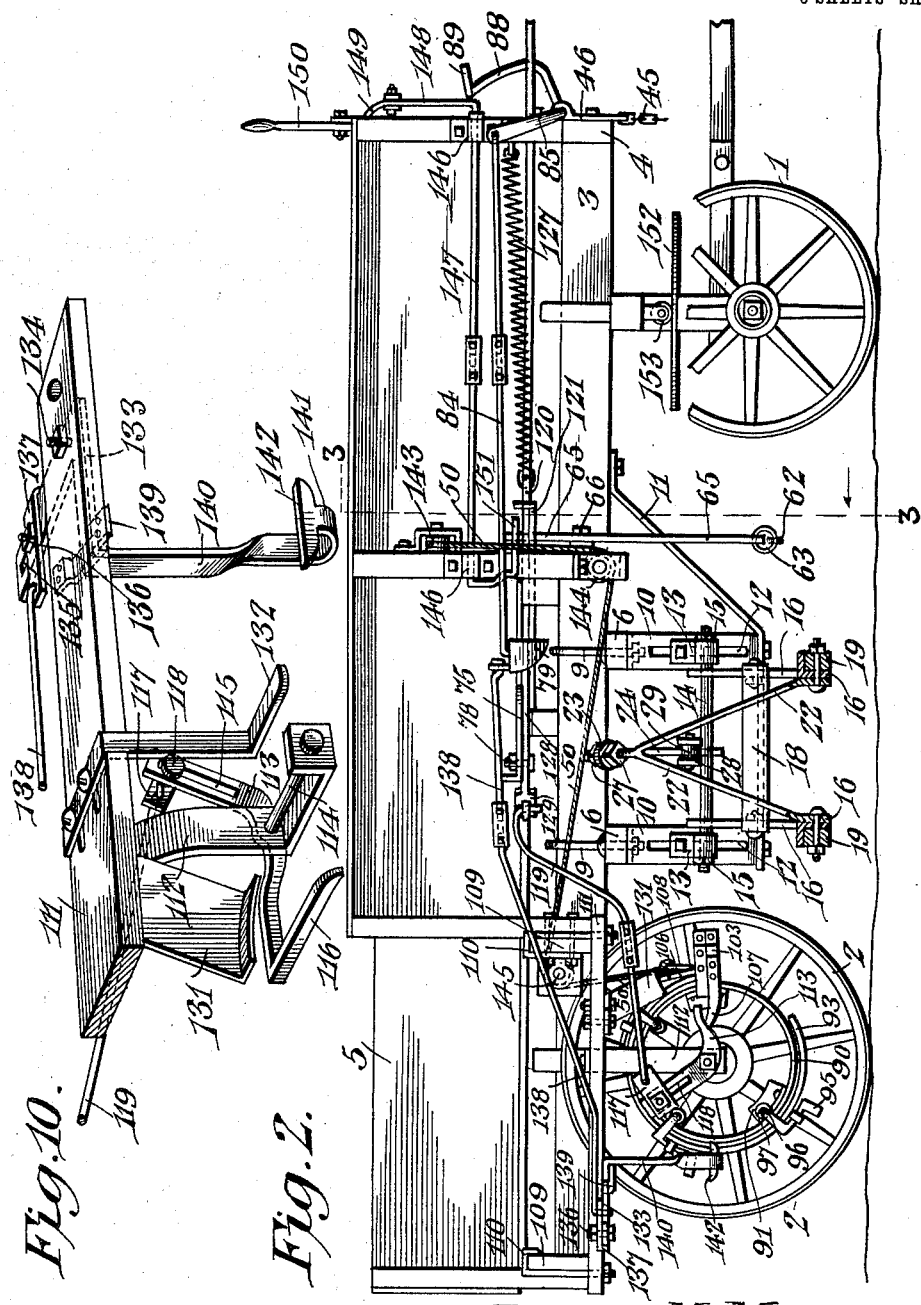
WITNESSES
Jas. H. McCathran
F. T. Chapman
David M. Myers, INVENTOR
BY
E. G. Siggers
ATTORNEY D. M. MYERS.
HAY AND GRAIN LOADER.
APPLICATION FILED MAR. 13, 1911.
1,019,344.
Patented Mar. 5, 1912.
5 SHEETS—SHEET 3.
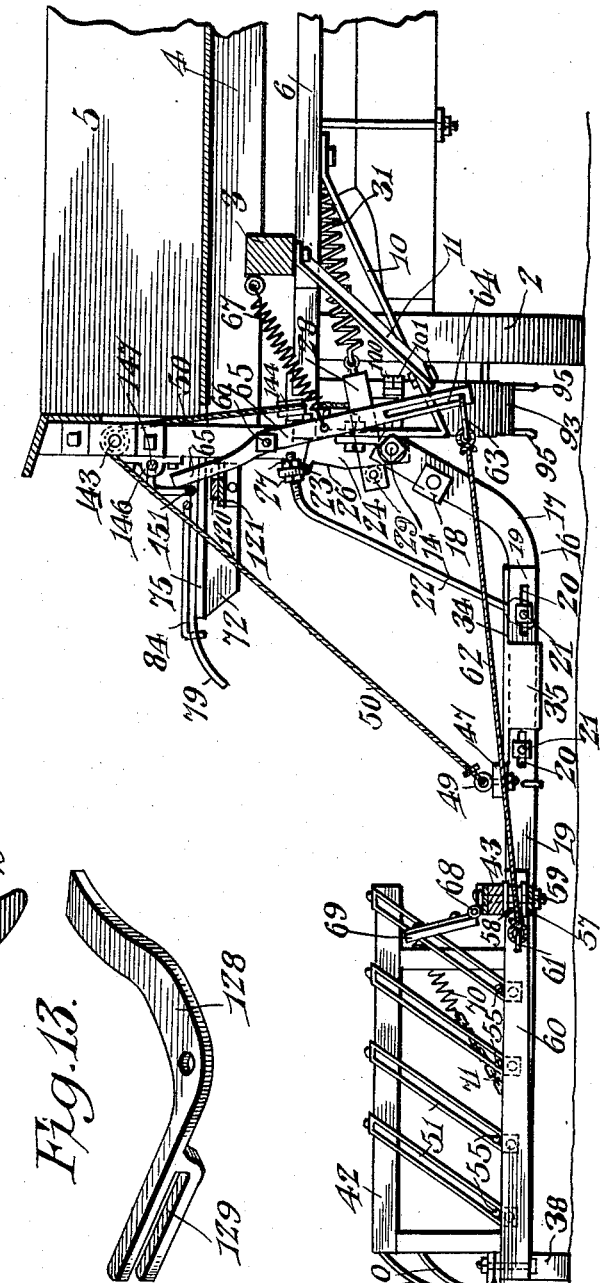
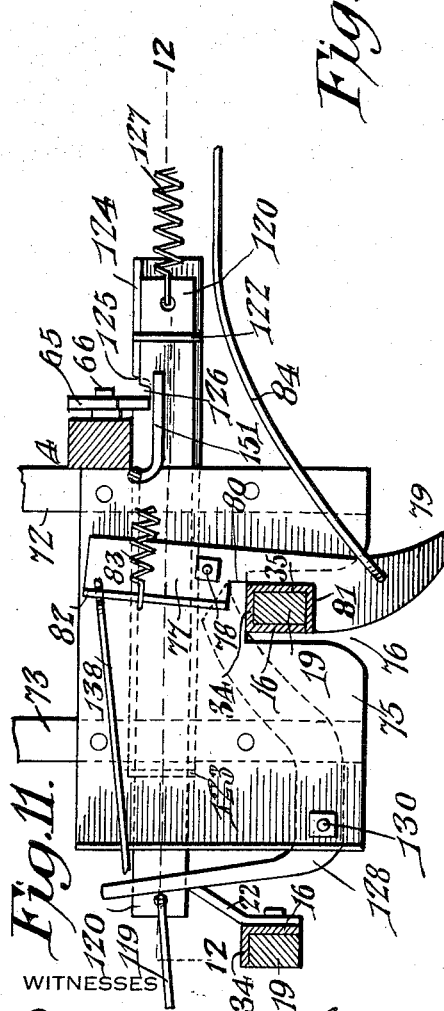
WITNESSES
Jas. K. McCathran
F. T. Chapman
David M. Myers, INVENTOR
BY
E. G. Siggers
ATTORNEY

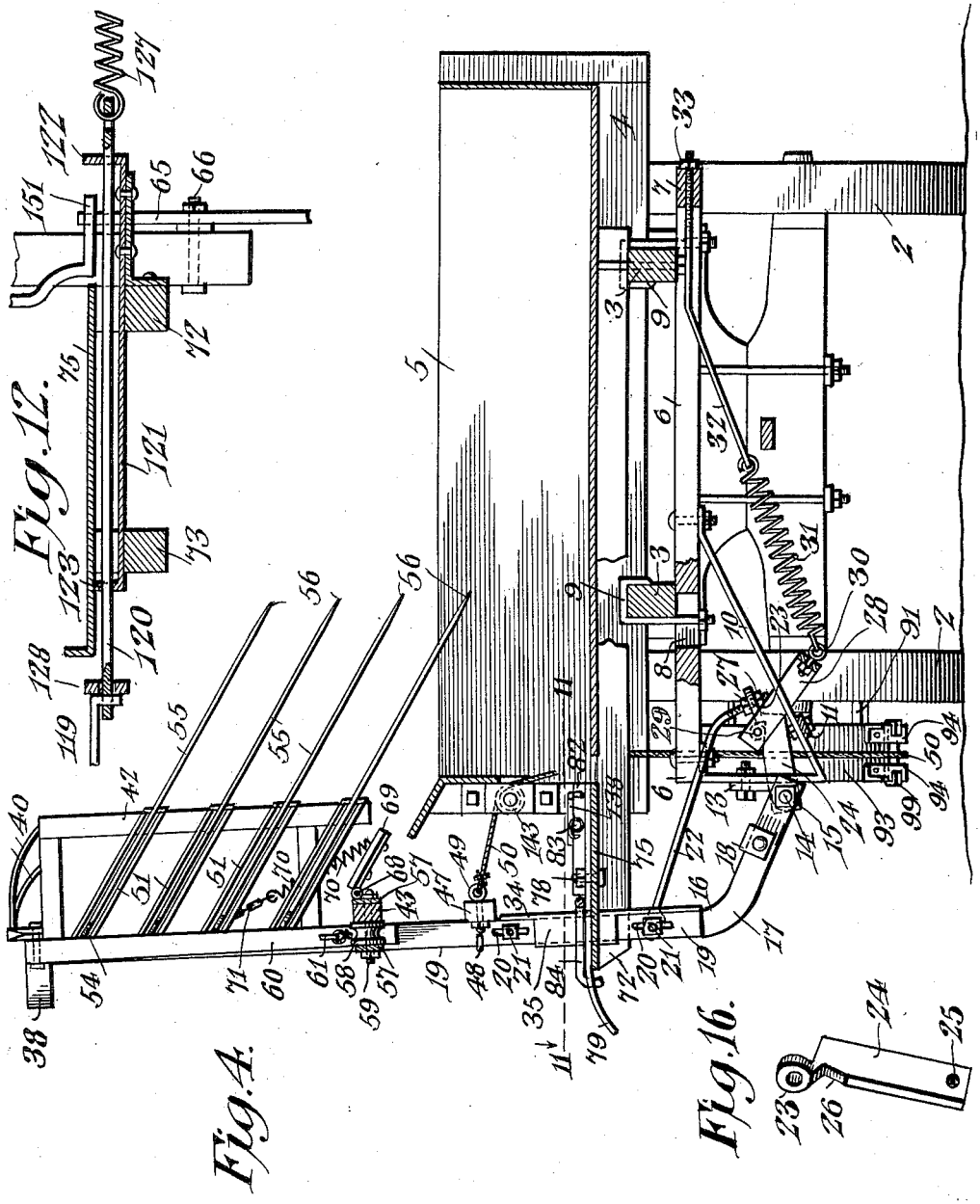

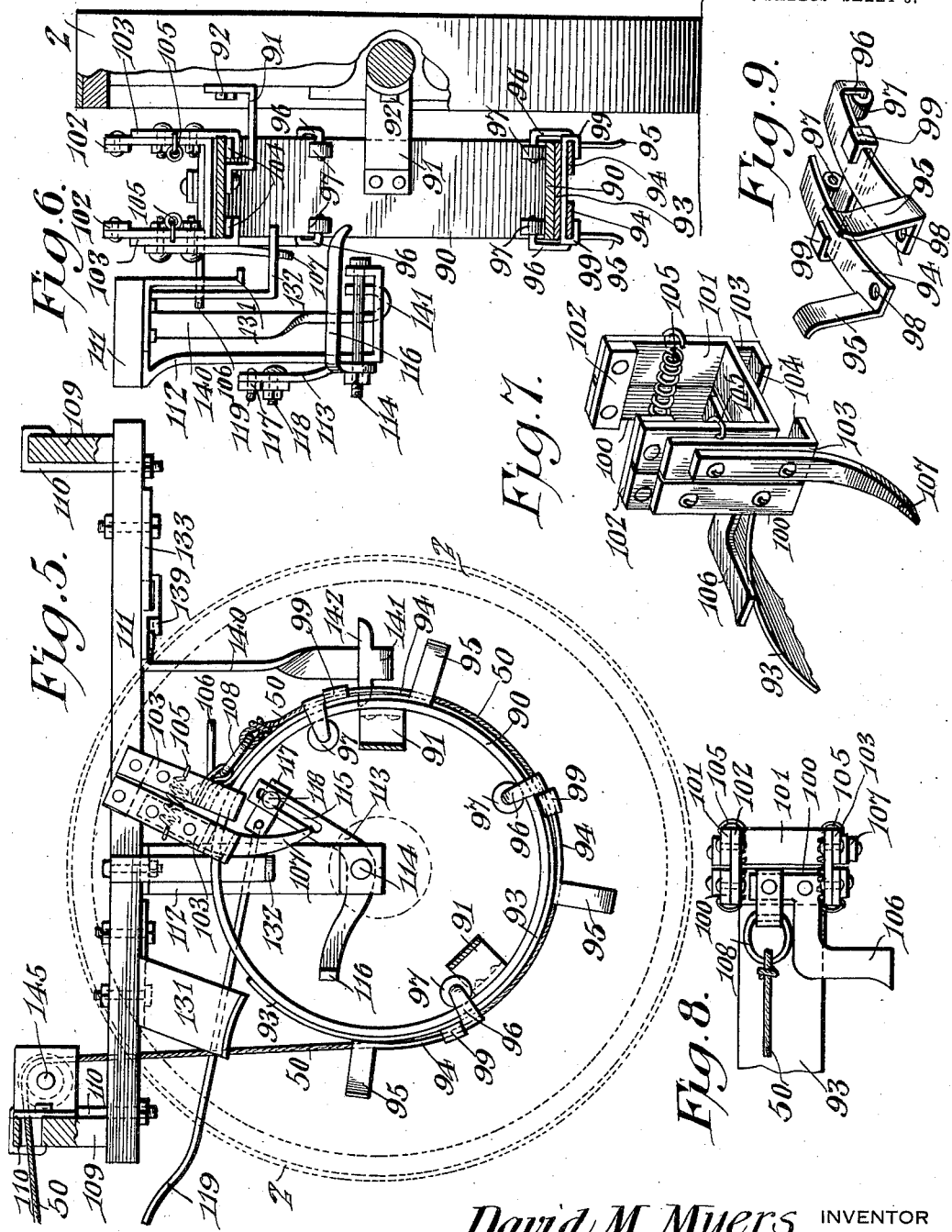

UNITED STATES PATENT OFFICE.

DAVID M. MYERS, OF HURDSFIELD, NORTH DAKOTA, ASSIGNOR TO MYERS MANUFACTURING COMPANY, OF FARGO, NORTH DAKOTA, A CORPORATION OF NORTH DAKOTA.

HAY AND GRAIN LOADER.

1,019,344.  Specification of Letters Patent.  Patented Mar. 5, 1912.

Application filed March 13, 1911. Serial No. 614,244.

*To all whom it may concern:*

Be it known that I, DAVID M. MYERS, a citizen of the United States, residing at Hurdsfield, in the county of Wells and State of North Dakota, have invented a new and useful Hay and Grain Loader, of which the following is a specification.

This invention has reference to improvements in grain and hay loaders and is designed to provide an attachment for an ordinary hay wagon whereby on the progressive movement of the wagon a loading mechanism is brought into engagement with shocks of grain or hay so that such shocks are first engaged by the loading device and are then lifted by the latter as the wagon progresses and finally deposited on the wagon, the loading mechanism then becoming latched and only again moving to the operative position at the volition of the operator or driver. By this means the loading attachment may be normally maintained in the inactive position and is only dropped into such relation to the ground as to catch the shocks when the driver so desires, and, furthermore, provision is made for the lifting of the mechanism to the inactive position by the progressive movement of the wagon even though no shocks of grain be present to cause the automatic operation of the device.

In accordance with the present invention there is provided a hinged frame at one side of the wagon, usually, though not necessarily, the right side, and this frame is provided with fingers in position when the frame is active to enter a shock or shocks in the path of these fingers in piercing relation thereto, and by means of a latch mechanism the movement of the wagon relative to the shocks upon the ground causes a coupling of an elevating mechanism to one of the wheels of the vehicle, whereby the shock is lifted high enough to pass over the edge of the rack of the wagon, and from this point it will gravitate into the wagon, while the lifting mechanism is locked in the elevated position and the actuating wheel is uncoupled from the lifting mechanism, so that the wagon may progress without interference. By means of a release mechanism within the reach of the driver or other operator the lifting mechanism for the shocks may be caused to move again to the active position ready to engage another shock to be set thereby into active movement to lift the shock and deposit it into the wagon.

The entire structure is of a nature to adapt its application to existing wagons commonly found in localities where it is desirable to gather up shocks for transportation to other places, and the installation of the attachment requires no change whatsoever in the wagon structure further than the attachment directly to the wagon structure of certain members forming parts of the attachment as a whole.

While the device is adapted for the loading of hay and other materials, as well as grain, the description of the structure will be limited for purposes of simplicity to shocks of grain and the operator will be considered as the driver of draft animals.

The invention will be best understood from a consideration of the following detailed description taken in connection with the accompanying drawings forming a part of this specification, but while the drawings show an operative structure in practical form, it is to be understood that there are various changes and modifications of the structure well within the scope of the invention, and consequently the invention is not at all limited to the details of structure shown and described.

In the drawings:—Figure 1 is a plan view of a hay or grain wagon with the attachment applied, some parts of the wagon being broken away and some parts of the attachment being in section to more clearly exhibit the structure. Fig. 2 is a side elevation of the wagon and adjacent parts of the attachment with the shock lifting frame shown in section on the line 2—2 of Fig. 1 and some parts of the wagon structure broken away. Fig. 3 is a section on the line 3—3 of Fig. 2, with the shock elevating frame in the lowered position. Fig. 4 is a view similar to Fig. 3 with the shock elevating frame in the elevated position and with some of the more distant parts of Fig. 3 shown in section. Fig. 5 is an elevation, partly in section, of the structure carried by the actuating wheel of the wagon with said wheel shown in dotted lines and a portion of the supporting structure for parts of the actuating mechanism adjacent to the wheel carried mechanism shown in section and in elevation. Fig. 6 is a central vertical section of the structure shown in Fig. 5, looking toward the left of Fig. 5 and with some parts shown in elevation. Fig. 7 is a perspective view of the portion of the structure shown in Figs. 5 and 6. Fig. 8 is a plan view of the structure shown in Fig. 7 with some parts omitted. Fig. 9 is a perspective view of a guide attachment for a cable carrying band on the drive wheel. Fig. 10 is a perspective view of the relatively stationary members coacting with the wheel carried members. Fig. 11 is a section on the line 11—11 of Fig. 4 but drawn to a larger scale. Fig. 12 is a section on the line 12—12 of Fig. 11. Fig. 13 is a perspective view of a bell crank lever embodied in the structure shown in Fig. 11. Fig. 14 is a section on the line 14—14 of Fig. 1. Fig. 15 is a perspective view of a foot actuated rock shaft located at the front of the wagon. Fig. 16 is a perspective view of an arm carried by the pivot support of the elevating frame.

Referring to the drawings, there is shown a wagon having front and rear wheels 1 and 2, respectively, carrying a frame having longitudinal members 3 and cross members 4 provided with the usual rack 5 common to hay wagons or wagons of like character. The showing of the drawings with respect to the wagon is to be taken as indicative in greater part, since the particular structure of the wagon is not material to the present invention and certain parts of the wagon structure are only referred to to facilitate the description.

About midway of the length of the wagon there is secured to the longitudinal members 3 a frame 6 made up of spaced side members and a connecting end member 7. The side members are provided with longitudinal slots 8 for the reception of the ends of hook bolts 9 which latter have their hook ends in embracing relation to the corresponding longitudinal members 3, so that frame 6 is readily attached to a wagon frame without any necessity of changing the latter at all, and because of the slots 8 the frame may be adjusted in the direction of its length, which direction is transverse to the length of the wagon body and because of the hook bolts the frame is readily adjustable lengthwise of the wagon body.

Made fast to the ends of the side members of the frame 6 remote from the connecting member 7 are brackets 10 of generally triangular shape in the showing of the drawings, although this shape is not mandatory, and these brackets have each one end dropping from the corresponding end of the side member of the frame 6 carrying it, considering the wagon in its usual position, while the other portion of the bracket is secured to the same side member at an appropriate distance from the end to which the first named portion of the bracket is connected, thus forming a rigid structure. In order to brace this portion of the structure the bracket 10 toward the front of the wagon is connected by a brace bar 11 to the corresponding longitudinal member 3 in position to resist dragging strains. The depending portion of each bracket 10 is formed with a longitudinal slot 12 by means of which an eye block 13 is bolted to the bracket 10 in any position of adjustment permitted by the length of the slot 12. There are two brackets 10 and two eye blocks 13 and these latter serve to support a rod 14 free to turn in the blocks and held against longitudinal movement by nuts 15 or otherwise. The rod 14 has fast thereto the corresponding ends of the side members 16 of a substantially rectangular frame, the ends of this frame connected by the rod 14 being at an angle to the rest of the frame, as indicated at 17, and in order that the ends of the frame where connected by the rod 14 may be held in fixed relation one to the other, a bracing strip 18 is carried from one end 17 to the other and secured thereto by bolts or rivets or any other manner.

The two side members 16 have secured to their longer ends strips 19 of appropriate length, these strips being formed with longitudinal slots 20 for the passage of securing bolts 21, these bolts extending through the side members 16 and the bolts nearer to the curved ends 17 passing through eyes formed in the ends of yoke arms 22, the other ends of which are connected together and pass through an eye 23 at one end of an arm 24, the other end of which is formed with a passage 25 traversed by the rod 14 and is secured thereto about intermediate of the length thereof in any suitable manner, so that the arm will participate in any rotative movement of the rod 14, and the latter fitting snugly in the ends 17 of the side members or arms 16 will participate in any movement of these arms, and consequently with the parts carried by these arms. The arm 24 adjacent the eye 23 is formed with a notch or recess 26 for a purpose which will presently appear. In order that the connected ends of the yoke arms 22 may be secured to the arm 24, these connected ends may be threaded where they pass through the eye 23 and nuts 27 applied to the threaded connected portion of the arms 22 on each side of the eye 23 serve to secure the parts together for simultaneous movement.

In embracing relation to the arm 24 is a yoke 28 carrying a roller 29 in position to ride along the notched edge of the arm 24, while the other end of the yoke 28 is provided with an eye 30 to which is connected one end of a spring 31 preferably of the cylindrical type, while the other end of the spring is connected to a rod 32 carried to and through the connecting end piece 7 beyond which it may be threaded for the application of a nut 33, whereby the tension of the spring is readily adjusted. As will presently appear, the arms 16 and the bars 19 fast to these arms, together with the parts carried by the arms and bars or strips move about the axis of the rod 14, which latter is substantially longitudinal to the wagon and is consequently approximately horizontal when the wagon is in operative position, so that the movement of the parts about the longitudinal axis of the rod 14 is in a plane substantially vertical or perpendicular to the ground or other support upon which the wagon travels, and for simplicity of description it will be assumed that the plane of movement of the parts about the rod 14 is a vertical plane. The purpose of the spring 31 is to ease the movement of the bars or strips 19 and parts carried thereby toward the ground, while the same spring will act to facilitate the raising of the bars or strips 19 and parts carried thereby, especially toward the termination of their travel to the upright position, the range of movement of these bars being from an approximately horizontal position to an approximately vertical position. Assuming that the bars or strips 19 and the parts carried thereby are in a substantially vertical position, as shown in Fig. 4, the roller 29 of the yoke 28 will rest in a notch 26, but when the parts are moved to the approximately horizontal position, shown in Fig. 3, the arm 24 is raised through an upright position to a position silghtly inclined away from the wagon body, so that the pull of the spring 31 will cause the yoke 28 to ride out of the notch 26 and along the corresponding edge of the arm 25 until arrested by the rod 14, when it is so near the axis of movement of the bars or strips 19 and parts carried thereby as to have no material effect thereupon, but as soon as the bars 19 are lifted toward the vertical position the arm 24 is turned by the upright position until it inclines toward the body of the wagon when the yoke 28 will ride toward the notched end of the bar and finally lodge therein and to a commensurate extent assist in the uplifting of the bars or strips 19 and parts carried thereby. The primary object, however, of the spring 31 is to ease the fall of the bars 19, which fall is brought about solely by gravity.

The side members or arms 16 are usually made of metal and the strips or bars 19 are usually made of wood, and in order to make a strong connection between these parts it is customary to form the arms or bars 16 where engaging the bars 19 with an angle web 34, which for a portion of its length may be extended as shown at 35 to partially or wholly embrace the corresponding part of the bar 19. The ends of the arms or bars 16 remote from the ends 17 are bent at an angle to the main portion of the bar and carried into side engagement one with the other, as shown at 36, where they may be united by bolts 37.

The ends of the bars 19 remote from the arms or bars 16 are connected by a shoe 38 secured to the bars by bolts 39 or otherwise, and this shoe 38 is designed to engage the ground when the bars 19 are in the substantially horizontal position to support the outer ends of the bars, the inner ends being supported by the arms or bars 16 and the pivot rod 14.

Carried by the outer ends of the bars 19 is a guide finger 40 at a slightly obtuse angle to the bars, so that when the said bars are in the substantially horizontal position the outer end of the finger 40 is more remote from the wagon than the corresponding ends of the bars, the design of this finger being to engage shocks and guide them toward the bars 19, the latter, together with the arms 16, constituting the main portion of the frame of the shock engaging and lifting device. The finger 40 may be made of any appropriate material and may be of any appropriate construction, and if made of metal may be of web construction for strength and lightness, but it is usually made of wood, in which case it may be shaped as indicated in the drawings. Erected on the bar 19 toward the rear of the vehicle is a frame comprising uprights 41 and a connecting cross piece 42, although the particular construction of the frame is not mandatory. This frame extends from near the outer end of the bar 19 carrying it for an appropriate distance toward the vehicle end of the bar, and adjacent the inner end of the frame there is secured to the two bars 19 a cross bar 43 in divergent relation to the finger 40. This bar 43 extends a distance forward from the forward bar 19 and at the front end has connected to it a rod 44, which latter may be formed with eyes at each end, one eye forming a pivotal connection for the rod where secured to the front end of the bar 43 and the other end receives a chain 45 carried to a bracket 46 on the front cross beam 4 of the vehicle frame, the purpose of the rod 44 being to resist the drag on the shock elevating frame, while the chain 45 forms a flexible connection permitting the turning of the shock elevating frame about its pivot rod 14. There is, also, secured to the two bars 19 a strip 47 by means of hook bolts 48, so that this strip may be readily adjusted and the forward end of the strip projects beyond the forward bar 19, where it is provided with an eye bolt 49 to receive one end of a strand 50, which strand may be in the form of a steel rope, but the particular character of the strand is not material, except that it should be flexible for a purpose which will hereinafter appear.

Extending from the front bar 19 to the connecting member 42 of the frame erected on the rear bar 19 is a series of guides 51, each preferably formed of two associated parallel members, and these guides are slanted to the length of the shock elevating frame, so that the ends connected to the front bar 19 are nearer the outer ends of these bars than the ends connected to the member 42.

In line with the lower end of each guide 51 is an eye bracket 52 secured to the rear beam 19 by a bolt 53 or otherwise, and each eye bracket 52 receives the eye end 54 of a stabbing finger 55, the other end of such finger being pointed, as indicated at 56. When the shock engaging and elevating frame is in the lower or active position, the stabbing fingers 55, of which there are an appropriate number, are directed forwardly in substantially perpendicular relation to the bars 19 and in substantially parallel relation one to the other, each stabbing finger 55 projecting through a guide 51 and resting upon the forward bar 19 adjacent to the guide 51 individual to the stabbing finger where such guide is attached to the bar 19. In the particular showing of the drawings there are four stabbing fingers 55 and four guides 51, but it will be understood that this particular number is not mandatory and may be varied as circumstances may demand. The length of the stabbing fingers 55 is such that they may be forced into a shock to a sufficient extent to either traverse the same or to positively engage the shock for lifting purposes when the movement of the fingers into the shock has been arrested by the engagement of the lifting frame with such shock. The pointed ends of the fingers 55 may stop short of the forward end of the guide finger 40.

The bar 43 is secured to the top of the bars 19 and there is also provided a strip 57 secured to the bottom of the forward bar 19 and to the forward end of the bar 43, which strip may be made of metal, while between this strip and the bar 43 there is lodged a roller 58 held in position by a pivot bolt 59.

Pivoted to the finger 40 adjacent the outer end of the forward bar 19 is an arm 60 in traversing relation to the space between the finger 40 and the bar 43 and having the end adjacent the bar 43 underriding the latter and resting on the strip 57. Secured to the bar 60 adjacent the bar 43 by means of an eye 61 is a flexible strand 62 with the end thereof remote from the arm 60 secured to a ring 63 passed through a slot 64 in one end of a lever 65 secured by a pivot bolt or pin 66 to the end of one of the cross beams 4 of the wagon body frame. The lever 65 serves as a latch lever, as will hereinafter appear, and is maintained normally at one limit of its movement by a spring 67 fast at one end to the lever below the pivot bolt 66 and at the other end to the adjacent longitudinal beam 3 of the wagon or vehicle frame. The spring 67 serves to maintain the lever 65 in a position where the end containing the slot 64 is retracted toward the body of the vehicle, this resulting in holding the arm 60 in a position where its free end, that is the end lodged in the space between the bar 43 and the strip 57, is held close to the roller 58, so that when the device is in operative position and the fingers 55 enter a shock, the arm 60 on the progressive movement of the device will ultimately engage the shock and be forced by the same against the action of the spring 67 toward the adjacent bar 19, this resulting in the moving of the lever 65 on its pivot 66, so that the latch end of the lever is moved toward the vehicle body, the spring 67 yielding to such movement and as soon as the pressure on the arm 60 is released the spring will return the parts to the normal position. The movement of the arm 60 by the shock is limited by the engagement of the arm with the forward bar 19.

Mounted on the top of the bar 43 are hinges 68 carrying a board 69 urged toward the shock receiving end of the shock carrier by a spring 70 connected at one end to one end of the board and at the other end to the rear beam 19, the connection to the beam being shown in the drawings as by way of a chain 71, although this is not mandatory, but preferable. The spring provides for the yielding of the board 69 to a pressure superior to the resistance of the spring.

The board 69 projects forwardly beyond the front bar 19 to an extent about equal to the finger 40 but in divergent relation to the latter, as indicated in Fig. 1, so that the finger 40 and board 69 form a directing means for the shocks, whereby they will, if somewhat out of line with the fingers 55, be directed into engaging relation to the latter.

Secured to a longitudinal beam 3 adjacent an intermediate cross beam 4 of the rack supporting frame is a strip 72, and secured to the longitudinal beams 3 in parallel spaced relation to the strip 72 is another like strip 73, these strips being made fast to the respective beams 3 by hook bolts 74, so that they may be readily adjusted to different wagons. The two strips 72 and 73 extend beyond the side of the wagon structure to which the shock elevating frame is secured and support a plate or shelf 75, in the outer edge of which there is formed a notch 76. The plate 75 has secured to its upper surface a latch lever 77 by a pivot bolt 78 or otherwise, and this latch lever has a beveled end 79, back of which the latch is provided with a notch 80 forming a shoulder 81 at the termination of the beveled end of the latch lever toward the pivot bolt 78. The end of the lever remote from the beveled end may have one edge upturned in the form of a web 82 for purposes of strength and for the attachment of other members, or the lever may be otherwise formed. The notch 80 is so positioned as to be substantially coincident with the notch 76 of the plate or shelf 75, but the lever is movable about its pivot to carry the beveled end away from its notch 76. The plate 75 is so positioned that when the shock elevating frame is moved from the horizontal to the vertical position the flange extension 35 in embracing relation to the corresponding portion of the bar 19 is brought into engagement with the beveled end of the latch lever and the latter is forced to one side about its pivot 78, so that the forward bar 19 may enter the notch 76 and when this bar has entered such notch and moved beyond the shoulder 81 the latch lever will snap into latching relation to such bar to thereby hold the shock elevating frame in the substantially vertical position. In order to cause the latch lever 77 to have a normal tendency to snap into engagement with the forward bar 19 but yield to the movement of the same into the notch 76, there is provided a spring 83, one end of which is attached to the web 82 and the other end of which may be made secure to any fixed portion of the body structure of the wagon, as, for instance, one of the cross beams 4.

The latch lever has connected to its beveled end a rod 84, the other end of which is carried to the forward end of the wagon body, where it is pivotally connected to a rock arm 85 on the corresponding end of a rock shaft 86 journaled in the bracket 46 and provided with another journal bearing 87, both on the forward cross bar 4 of the rack frame of the wagon or vehicle. The rock shaft 86 has at the end remote from the arm 85 another arm 88 terminating in a foot plate 89 which may be located within easy reach of the foot of the driver of the vehicle, so that such driver may operate the rock shaft 86 to cause a movement of the latch lever 77 in a direction to release the bar 19 engaged by this latch lever and thereby permit the shock elevating frame to gravitate toward the horizontal position, it having a normal tendency to so move because of the curved ends 17 of the arms 16, whereby the supporting rod 14 is nearer the center line of the wagon body than is the latch lever 77.

The shock elevating mechanism in so far as the frame carrying the shock engaging fingers and coacting parts is concerned has the shoe 38 resting upon the ground when the parts are in position to engage a shock and the wagon with the shock engaging mechanism is caused to travel over the ground into operative relation to the shocks, either by draft animals or otherwise. In order to prevent disturbance of the shocks, such as would tend to shake out any loose grain therefrom, the shock engaging means is caused to move toward the vertical position as soon as it has safely engaged the shock, so as to elevate the latter high enough to be deposited in the body portion of the wagon. For this purpose the progressive movement of the wagon is utilized and one of the rear wheels is employed as an actuating wheel to cause the desired movement of the shock engaging means toward the vertical position for the lifting of the engaged shock and the deposition thereof in the wagon. The actuating means provided by the present invention may be attached to the wagon wheel and wagon body without any change in the latter, the entire change in the normal wagon structure necessitated by the installation of the present invention being limited to the boring of a few bolt holes and the insertion of a few screws, but no change whatsoever requiring any modifying of the structure of wagons of existing types is demanded.

The rear wheel 2 on the side of the wagon to which the shock elevating frame is attached is provided with a winding mechanism, and this winding mechanism has associated therewith certain parts carried by the wagon frame structure to cause the operation of the winding mechanism under certain circumstances and to render the latter inactive under other circumstances.

The parts directly connected to the rear wheel and the parts directly associated therewith are best shown in Figs. 5 to 10, both inclusive. There is attached to the wheel 2 a ring 90, by means of a suitable number of brackets 91, each attached to about a middle point on the inner face of the ring and then bent away from the ring toward the center thereof and then into parallel relation with the ring with the end remote from the ring at an angle to the bent away portion and shaped to fit a wheel spoke to which it may be attached by a bolt or screw 92. An appropriate number of these brackets may be provided. While it is preferable that this ring should be concentric with the axis of rotation of the wheel, moderate eccentricity is not at all material to the proper working of the structure. Mounted on the ring 90 is an incomplete band 93 preferably having a slight elasticity so as to tend to a small degree toward the straight position. Secured at intervals to opposite sides of the band 93 are strips 94 each terminating at one end in an outstanding finger 95 and at the other end in an ear 96 adapted to extend toward the center of the ring 90 and at the end provided with a roller 97 in position to engage the inner face of the ring 90. The ends of the strips 94 carrying the fingers 95 may be provided with holes 98 for the passage of rivets or other fastening means, whereby these strips are attached to the band 93 or the roller ends of these strips may be held together by a clip 99 having its ends in embracing relation to the strips and its connecting part extending between these strips. By these means the strips may be readily attached to the band with the rollers in embracing relation to the ring 90, or other means may be provided whereby the band is held to the ring and means similar to the outstanding fingers 95 are provided to form the band into a pulley like structure, there being a sufficient number of the pairs of outstanding fingers 95 or other devices adapted to a like purpose for guiding a strand around the band, as will hereinafter appear.

The fastening means for securing the strips 94 to the band 90, which fastening means traverse the openings 98, may be so related to the strips that the latter can be turned on the fastening means as pivots, and then when for any reason it is desirable to remove the band from the ring 90 it is only necessary to unbend the ends of the clips 99 from embracing relation to the strips 94 and the said strips may be turned on their pivots to carry the rollers 97 from engagement with the inner face of the ring 90, so that the entire band is released and may be removed from the ring. The reverse operation will result in the securing of the band to the ring.

One end of the band 93 is made fast to a clutch device comprising two U-shaped members 100 and 101 having the free ends of the like legs connected together by links 102, so that these members 100 and 101 may swing toward and from each other at the yoke ends. The band 93 has its end made fast to the member 100 and both members have strips 103 made fast to the leg portions, these strips terminating in angle extensions 104 adapted to extend in embracing relation to the angle face of the ring 90, one extension 104 of one leg of each member 100 and 101 projecting toward the extension 104 of the strip 103 carried by the other leg. The two members 100 and 101 are constrained one toward the other by springs 105 connected to the like legs of these members between the yoke ends of the members and the links 102.

The member 100 has fast to its yoke portion an angle finger 106 in position to project laterally beyond the corresponding edge of the ring 90, and the other member 101 has a curved finger 107 projecting generally toward the center of the ring 90 and also in a direction outward from the plane of the outer edge of the ring 90, the outer edge of the ring being that remote from the wheel to which the ring is secured. Furthermore, there is made fast to the member 100 a connecting ring 108 to which is secured the end of the strand 50 coming from the bar 47 before mentioned and traversing a path to be presently described.

The cross beams 4 of the wagon frame located adjacent the rear wheel 2 under consideration have made fast thereto extension strips 109, and these extension strips have made fast thereto by hook bolts 110 another strip 111 extending from one strip 109 to the other in a position outside the wheel 2 and the ring 90 carried thereby, that is, the strip 111 is farther from the wagon body than is the wheel 2. The strip 111 carries a bracket 112 to which is pivoted a lever 113 by a pivot rod or bolt 114, the bracket being so shaped as to bring the pivot of the lever 113 close to the axis of rotation of the ring 90 in the particular showing of the drawings, although this exact arrangement is not mandatory. The lever 113 is of the first order and has one arm at nearly right angles to the other, so that the lever is in the nature of a bell crank lever. One angle arm of the lever is provided with a longitudinal slot 115 and the other arm of the lever terminates in a substantially right angle extension 116. Connected to the slotted end of the lever is an eye member 117, a bolt 118 being employed for connecting the eye 117 to the slotted end of the lever, so that this eye member may be secured at any point of adjustment lengthwise of the slotted arm of the lever within the limits of the slot 115. The eye member 117 has connected thereto one end of a rod or link 119, the other end of which is connected to a slidable bar 120 mounted on a guide strip 121 made fast to the supporting bars 72 and 73 beneath the plate 75, the bars being appropriately notched for the passage of the bar 120 and the supporting strip 121. This strip 121 extends beyond the bar 72 toward the front of the machine, where it may be upturned, as indicated at 122, and provided with a passage for the slidable bar 120 to guide the same and a like upturned end 123 may be provided at the rear end of the bar 73 for a like purpose. Furthermore, the forward projecting end of the strip 121 may have a stiffening flange 124 formed on one side. The guide strip 121 is formed with a notch 125 for the entrance of the latch end of the lever 65 and the slidable plate 120 is formed with a notch 126 matching the notch 125 and provided for a like purpose. The end of the slidable bar 120 remote from that connected to the rod or link 119 has connected thereto one end of a spring 127, the other end of which is made fast to a fixed portion of the frame of the wagon body, say the front cross piece or beam 4, the spring having a normal tendency to carry the bar 120 toward the front of the vehicle.

Pivoted to the plate or table 75 and underlying the same is an angle lever 128 shown separately in Fig. 13. One arm of this lever 128 has its end bifurcated, as indicated at 129, and embraces the end of the slidable bar 120 close to the connection therewith of the rod or link 119, so that movement of the bar 120 under the action of its spring 127 will cause a rocking of the lever 128 about its pivot support indicated at 130 because of the engagement with this lever of the link 119 where connected to the bar 120. The other end of the lever 128 is of sufficient length and so shaped as to be movable in traversing relation to the notch or recess 76 in the plate or table 75 and the range of movement of the lever 128 is such that when the bar 120 is released to the action of its spring 127 the end of the lever 128 adjacent the notch 76 is carried to the open end of this notch, so that when the shock elevator is lifted and the corresponding bar 19 thereof enters the notch 76 the lever 128 is engaged thereby and turned on its pivot support 130 in a direction to cause the bifurcated end 129 to engage the link 119 and force the bar 120 lengthwise against the action of the spring 127, extending the latter, and this movement is continued until the latch lever 65, under the action of the spring 67, snaps into the notch 126 ultimately brought into its path, thus locking the bar 120 against return movement under the action of the spring 127, so long as the lever 65 is under the control of the spring 67. There is also made fast to the strip 111 in pendent relation thereto a bracket 131 in the path of the finger 106 carried by the member 100 to which the band 93 is secured, the purpose of this bracket 131 being to arrest rotative movement of the band in one direction. There is also carried by the strip 111 a pendent angle bracket 132 in the path of the finger 107 when the band 93 is rotating with the wheel 2 in the forward movement of the vehicle. Carried by the strip 111 is another angle lever 133 connected to the strip 111 so as to move in substantial parallelism therewith by a pivot support 134, which may be in the form of a bolt. The lever 133 has one arm provided with a longitudinal slot 135 for a bolt 136 or other suitable fastening device connecting an eye member 137 to the slotted end of the lever in any desired position of adjustment, this eye member having pivotally connected thereto one end of a rod or link 138, the other end of which is extended to and pivotally connected to the flange 82 of the latch lever 77, so that the lever 133 participates in movements of the latch lever 77. The other arm of the lever 133 is supported by an elongated keeper bracket 139 fast to the under face of the strip 111, and beyond this keeper bracket the lever is bent at an angle to form a pendently disposed member 140 terminating in a return portion 141 carrying a laterally extended head 142, so positioned as to be normally in the path of the finger 106.

Returning to the strand 50, it will be observed that after leaving the bar 47 it is carried about a pulley 143 fast to an appropriate part of the frame of the wagon body, and by this pulley the direction of travel of the strand is changed and it is carried about another pulley 144 below the pulley 143 and from this pulley 144 the strand is carried toward the rear of the vehicle about still another pulley 145 mounted on an appropriate portion of the wagon frame or body, and from the last named pulley the strand passes to the ring 108.

Mounted in suitable bearings 146 on the side of the body of rack carried by the framework of the wagon is a rock shaft 147 having at one end, which is the front end, coextensive with the front end of the wagon body, a rock arm 148 connected by a link 149 to a hand lever 150 in position to be manipulated by the driver. The other or rear end of the rock shaft 147 is bent into a return member 151 to constitute a rock arm in operative relation to the latch end of the lever 65 to actuate said lever in opposition to its spring 67 and in the same direction in which it is moved by the strand 62.

When a wagon equipped as has been described is driven to the field where the shocks are located, the shock elevator is in the substantially upright position shown in Fig. 4, being locked in such position by the latch lever 77. At the same time the strand 50 is in part wound upon the band 93, and is thereby maintained in but a slightly slack condition, the finger 106 being then in engagement with the head 142 and the latch structure made up of the members 100 and 101 being in ungripping relation to the ring 90, so that the latter may turn freely with the wheel 2, the rollers 97 presenting an antifriction support for the band 93.

The wagon is driven into such relation to the shocks as the driver may desire, and then by a proper pressure upon a foot member 89 of the arm 88 the shaft 86 is rocked in a direction to act through the link 84 to move the latch end of the lever 77 in a direction to carry the shoulder 81 out of engagement with the bar 19, previously locked by the latch end 79 of the lever and the shock elevating frame then gravitates toward the ground moving about the bearings of the rod 14 as a pivot support. The fall of the shock elevator is eased by the spring 31 as already described, and ultimately the shoe 38 contacts with the ground, thus supporting the shock elevator in a position slightly elevated above the ground. The fall of the shock elevator draws on the strand 50 in a direction to move the band 93 counter-clockwise as viewed in Fig. 2, and this is permitted since the movement of the lever 77 to the unlatched position caused through the link 138 a rocking movement of the lever 133 in a direction to move the head 142 out of the path of the finger 106, so that there is presented no obstruction to the unwinding of the strand from the band 93, which operates after the manner of a winding drum. The parts are so proportioned that when the shock elevator is in the lowered position the finger 106 is sufficiently close to the stop bracket 131 to prevent undue unwinding of the strand although permitting the accommodation of the shoe 38 to varying levels of the ground, without slacking the strand 50 or putting it under strain to any material extent.

The driver directs the horses or other propelling means so that the stabbing fingers 55 are brought into engagement with a shock or the shock is moved into engagement with these fingers by the guiding finger 40. The progressive movement of the wagon causes the pointed ends 56 of the fingers 55 to enter the shock without any material disturbance of the latter and ultimately the arm 60 is brought into engagement with the shock and the weight of the latter is sufficient to move the arm 60 to actuate the strand 62 in a direction to rock the lever 65 against the action of the spring 67, the movement being sufficient to withdraw the latch end of the lever from the notch 126 of the slidable bar 120, and this slidable bar is then free to move under the action of the spring 127 in a direction to carry the lever 128, so that its appropriate end is in traversing relation to the entering end of the recess 76 and the link 119 draws the lever 113 in a direction to cause the inner extension 116 thereof to engage the finger 107 of the gripping mechanism to which the band 93 is connected, so that the member 101 of the gripper is moved away from the member 100, the latter being held by the strand 50 against movement, and the angle extensions 104 are brought into gripping engagement with the inner face of the ring 90, whereupon the rotative movement of the ring 90 with the wheel 2 causes an actuation of the band 93 with the ring 90 and the strand 50 immediately begins to wind upon the band 93 as upon a drum, the fingers 95 acting as guides and the strain on the strand 50 serving to maintain the gripper in firm engagement with the ring 90, the finger 107 in the meantime moving away from the extension 116.

The progressive movement of the wagon causes an elevating movement of the shock elevator with the shock fast thereto because of being pierced by the stabbing fingers 55, these latter serving to support the shock and carry it along with the shock elevator without disturbance, and this lifting movement continues until the latch end 79 of the lever 77 is engaged by the corresponding bar 19, the extension 35 of the flange 34 serving as a wear plate, and the lever 77 is forced out of the path of the bar 19 against the action of the spring 83 until the bar has passed the shoulder 81, when the spring 83 becomes active to rock the lever 77 to bring the shoulder 81 into obstructing relation to the bar 19. At the same time the movement of the lever 77 has caused a movement of the head 142 out of the path of the on-coming finger 106 of the gripper carried by the band 93, the parts being properly timed for the purpose, and the gripper has moved by the time the bar 19 is seated behind the latch head 79 into engagement by its finger 107 with the bracket 132, so that the gripper is forced to the ungripping position and the band 93 is released from the ring 90, whereby the wheel 2 may continue to rotate without affecting the band 93 which now remains quiescent, except that it may move backwardly until arrested by the head 142, thus relieving the strand 50 from strain, the slight slack of the strand under these conditions being immaterial.

As the shock elevator or carrier approaches the upright position the weight of the shock is borne by the board 69 held by the spring 70 and about the time that the shock carrier or elevator is moving into engagement with the latch lever 77 the weight of the shock is sufficient to overcome the spring 70 and the board yields thereto, while the inclined position of the guides 51 which now have the ends connected to the forward bar 19 more elevated than those connected to the strip 42 permits the movement of the fingers 55 along these guides 51 until they assume a declined position, such as illustrated in Fig. 4, and ultimately the fingers reach the ends of the guides adjacent the strip 42, then the yielding of the board 69 permits the shock to gravitate from the fingers 55, the shock sliding along these fingers and being directed by them and by the board 69 into the rack or body portion of the wagon or vehicle. It will be observed that the discharge of the shock from the stabbing fingers is due solely to the action of gravity, while at no time is the shock before entering the body of the vehicle in a position where there is a liability of loss of any loose grain, which loss often occurs where shocks are loaded into wagons by hand. It will be observed that the shock elevator when released moves to active position solely by the action of gravity, and by such movement sets the return mechanism in position to cause the elevation of the shock lifter and loader by the progressive movement of the vehicle in coaction with the shock itself, while the discharge of the shock from the elevating devices is accomplished solely by the action of gravity, the weight of the shock causing the fingers or tines 55 to move under the direction of the guides 51 toward the pendent position, so that the shock readily slides therefrom.

As the shock carrier is elevated and comes in contact with the lever 77 the movement of the latter to permit the passage of the forward bar 19 into the recess 76 has caused the operation of the lever 133 in the manner before described, and at the same time the lever 188 is actuated to return the bar 120 to a position where the latch lever 65 may enter the notch 126, to which last position it is constrained by the spring 67. As the shock elevator is moved about the axis of the rod 14 to the elevated position, the ring 63 slides along the slot 64, since the arc described by the eye 61 to which the rope or cable 62 is attached is on an axis displaced with relation to the slot 64 and consequently the slot provides for the changing relation without putting the strand or rope under undue strain. When the next shock in order is approached, the operator manipulates the foot member 89 to cause a release of the shock elevator, so it may gravitate again to the ground in position to engage and elevate the shock being approached, and this operation may be repeated from time to time as may be found necessary.

It sometimes transpires that after the shock elevating mechanism has been lowered to the ground, it is desirable that it be elevated without engaging a shock, and for this purpose the lever 150 is manipulated by the driver to rock the shaft 147, causing thereby a movement of the arm 151 into engagement with the latch end of the lever 65, thus withdrawing this lever from the notch 126, permitting the spring 127 to move the bar 120 in a direction to cause the lever 113 to actuate the gripper in a manner to couple the band 93 to the ring 90 and thus cause the winding of the strand or rope 50 on said band, and by this operation cause the elevation of the shock engaging and elevating means irrespective of the fact that the arm 60 has not been engaged by a shock.

It will be observed that provision is made for adjustments throughout the structure where such adjustments may be needed to adapt the attachment to wagons of different kinds, and it is because of these many adjustments that such adaptation is possible, and, furthermore, adjustments are provided for the establishing of the time relation of portions of the structure whereby not only is there compensation for wear but the time relation of the several parts may be changed as occasion may demand. It will also be observed that the united ends of the members 22 are threaded for a sufficient length to provide for adjustments whereby the spring carrying yoke 28 may be made to ride along the arm 25 at any period, within limits, of the approach of the shock elevating device to the ground, so that the easing of this shock elevating device may continue as long as found advisable.

Since the attachment adds weight to one side of the wagon, it is usually advisable to add to the fifth wheel or circular plate or ring 152 rollers 153 secured to the front bolster, so that there may not be excessive wear upon the bearing surfaces.

While the machine is primarily intended for the loading of shocks into a wagon, it is also adapted to the loading of other bundled material, and under some circumstances even of loose material, and in the following claims the word shock is to be considered as broad enough to cover any material in any form to which the machine may be adapted.

What is claimed is:—

1. A shock loading attachment for vehicles provided with shock engaging means, and a support for said shock engaging means movable from a substantially horizontal to a substantially upright position and provided with means for holding the shock engaging means substantially horizontal for the greater part of the movement of the support from the horizontal to the upright position, the shock engaging means being connected to the support for free movement by gravity toward a pendent position on the final part of movement of the supporting means to the upright position.

2. A shock loading attachment for vehicles comprising a shock engaging and elevating means, and actuating means for the shock engaging and elevating means responsive to the progressional movement of the vehicle, the shock engaging means being supported by the elevating means for free movement toward a pendent position solely by gravity on the movement of the elevating means to an upright position to cause the shock to gravitate from the engaging means.

3. A shock loading attachment for vehicles comprising shock engaging and elevating means movable when in operation from a position adjacent the ground to a substantially upright position, means for causing the movement of the shock elevating means toward the upright position by the progressional movement of the vehicle, means for holding the shock elevating means in the elevated or upright position, and means for releasing the shock elevating means for unimpeded movement to the lowered or active position solely by the action of gravity.

4. A shock loading attachment for vehicles having means for engaging and elevating a shock, said shock engaging and elevating means being attached to the vehicle on the vehicle side of its center of gravity when in the elevated position and movable toward the lowered or active position solely by the action of gravity, said engaging and elevating means being also provided with means resistant to the action of gravity for easing the fall of the shock engaging and elevating means under the action of gravity.

5. A shock loading attachment for vehicles provided with a shock engaging and elevating means having a pivot support on the vehicle side of its center of gravity when the said shock engaging and elevating means is in the elevated position, and a spring retarding means for resisting the movement of the shock engaging and elevating means toward the lowered position.

6. A shock loading attachment for vehicles provided with a shock engaging and elevating means having a pivot support on the vehicle side of its center of gravity when the said shock engaging and elevating means is in the elevated position, and a spring retarding means for resisting the movement of the shock engaging and elevating means toward the lowered position, said spring retarding means being connected to the shock engaging and elevating means by a movable member changing the relation of the spring to the shock engaging and elevating means when the latter approaches the lowered position.

7. A shock loading attachment for vehicles having a shock engaging and elevating means movable from a substantially upright position when in operation to a substantially horizontal position, said movement being brought about solely by gravity, and a retarding means for said gravitating movement comprising an arm movable with the shock engaging and elevating means, a spring, and a coupling member between the spring and said arm movable along said arm to decrease the effect of the spring on the approach of the shock engaging and elevating means to the horizontal position.

8. A shock loading attachment for vehicles comprising a shock engaging and elevating means movable by gravity from a substantially upright position to a substantially horizontal position when in operation about a pivot support, an arm in angular relation to the pivot support and participating in the movement of the shock engaging and elevating means, a yielding member resistant to the gravitating movement of the shock engaging and elevating means, and a movable connection between the resisting member and the arm movable along said arm toward and from the pivotal support in accordance with the direction of movement of the said shock engaging and elevating means.

9. A shock loading attachment for vehicles comprising a shock engaging and elevating means movable by gravity from a substantially upright position to a substantially horizontal position when in operation about a pivot support, an arm in radial relation to the pivot support and participating in the movement of the shock engaging and elevating means, a yielding member resistant to the gravitating movement of the shock engaging and elevating means, and a movable connection between the resisting member and the arm movable along said arm toward and from the pivotal support in accordance with the direction of movement of the said shock engaging and elevating means, said arm having means coacting with the connecting means for maintaining the connecting means at the outer end of the arm during the gravitating movement of the shock engaging and elevating means and releasing the connecting member to movement toward the pivotal support during the final portion of the gravitating movement of said shock engaging and elevating means.

10. A shock loading attachment for vehicles provided with a pivoted shock engaging and elevating means connected to the vehicle on the vehicle side of the center of gravity of the said means when in the elevated position and said means being movable solely by gravity from the elevated position to a substantially horizontal position when in action, an arm movable with said means and in substantially radial relation to the pivot support of said means, said arm having its outer end provided with a notch or recess, a spring connected at one end to a fixed portion of the vehicle structure, and a connector between the other end of the spring and said arm and movable along said arm between the notch or recess and the pivot support from which the arm projects.

11. A shock loading attachment for vehicles provided with a pivoted shock engaging and elevating means connected to the vehicle on the vehicle side of the center of gravity of the said means when in the elevated position and said means being movable solely by gravity from the elevated position to a substantially horizontal position when in action, an arm movable with said means and in substantially radial relation to the pivot support of said means, said arm having its outer end provided with a notch or recess, a spring connected at one end to a fixed portion of the vehicle structure, and a connector between the other end of the spring and said arm and movable along said arm between the notch or recess and the pivot support from which the arm projects, said arm being provided with means whereby its angular relation to the shock engaging and elevating means is changeable at will.

12. A shock loading attachment for vehicles provided with a shock engaging and elevating means movable from a substantially upright position to a substantially horizontal position and connected to the vehicle by a pivot support at the vehicle side of the center of gravity of said means when in the elevated position, said means being movable to the horizontal position by gravity, an arm in angular relation to said means and movable therewith about the pivot support, connections between said means and the arm for holding the latter in different positions of angular adjustment, said arm also being provided at the end remote from the pivot support with a notch or recess, a yoke member engaging said arm and provided with means at one end for movement along the notched portion of the arm to and from the pivoted end and into and out of the notch at the other end thereof, and a spring connected to the yoke member and to a fixed portion of the vehicle structure.

13. A shock loading attachment for vehicles provided with a shock engaging and elevating means movable from a substantially upright position to a substantially horizontal position and connected to the vehicle by a pivot support at the vehicle side of the center of gravity of said means when in the elevated position, said means being movable to the horizontal position by gravity, an arm in angular relation to said means and movable therewith about the pivot support, connections between said means and the arm for holding the latter in different positions of angular adjustment, said arm also being provided at the end remote from the pivot support with a notch or recess, a yoke member engaging said arm and provided with means at one end for movement along the notched portion of the arm to and from the pivoted end and into and out of the notch at the other end thereof, and a spring connected to the yoke member and to a fixed portion of the vehicle structure, and means for adjusting the tension of the spring at will.

14. A shock loading attachment for vehicles provided with a row of stabbing fingers or tines each hinged thereto for movement independently of the others, and means for maintaining each finger or tine in predetermined relation to the other fingers or tines, said holding means being constructed to permit individual movements of the fingers about their hinges.

15. A shock loading attachment for vehicles provided with stabbing fingers or tines hingedly connected thereto, and guides for the stabbing fingers for directing the movement of said fingers about the hinge connections.

16. A shock loading attachment for vehicles comprising a shock engaging and elevating means movable in action from a substantially horizontal position to a substantially upright position, said means having stabbing fingers or tines for engaging the shock and each connected to said means to move individually with relation thereto toward a pendent position when the said means is in the substantially upright position.

17. A shock loading attachment for vehicles comprising a shock engaging and elevating means movable in action from a substantially horizontal position to a substantially upright position, said means having stabbing fingers or tines for engaging the shock and connected to said means to move with relation thereto toward a pendent position when the said means is in the upright position, the shock engaging and elevating means carrying guides for the stabbing fingers for directing them toward the vehicle when the said means is in the upright position.

18. A shock loading attachment for vehicles comprising a frame structure, a pivot support therefor attachable to the vehicle whereby the frame structure may be moved to either a substantially horizontal position or a substantially upright position with relation to the vehicle, and stabbing fingers or tines hingedly connected at the butt ends of said frame and movable by gravity toward a pendent position when the frame is in the upright position.

19. A shock loading attachment for vehicles comprising a frame structure, a pivot support therefor attachable to the vehicle whereby the frame structure may be moved to either a substantially horizontal position or a substantially upright position with relation to the vehicle, and stabbing fingers or tines hingedly connected at the butt ends to said frame and movable by gravity toward a pendent position when the frame is in the upright position, said frame carrying guides for the stabbing fingers inclined with relation to the length of the frame.

20. In a shock loader for vehicles, an elongated frame, pivot connections for the frame attachable to the vehicle, whereby the frame may be moved with relation to the vehicle to a substantially horizontal position and to a substantially upright position, stabbing fingers or tines carried by the frame near the end thereof remote from the pivoted end, said stabbing fingers being hingedly connected at the butt ends to the frame, another frame carried by the first named frame at an angle thereto, and guides for the fingers each connected at one end to the first named frame in position to hold the stabbing fingers in the direction of travel of the vehicle and at the other end connected to the second frame in compound inclination to the first named frame to direct the fingers when the first named frame is in the upright position toward the pendent position but at an inclination thereto away from said first named frame.

21. In a shock loader for vehicles, an elongated frame structure, hinge connections for supporting said frame at one side of the vehicle for movement to a substantially horizontal position at substantially right angles to the line of travel of the vehicle and to a substantially upright position at the same side of the vehicle, stabbing fingers or tines carried by the frame at the end remote from the hinged end, said stabbing fingers having eye connections at their butt ends with the frame, guides for the fingers inclined both to the length of the frame and to the plane thereof to hold the fingers in the line of travel of the vehicle when the frame is horizontal and to direct them toward a pendent position but at an angle thereto in the direction of the vehicle when the frame is upright, and a yieldable supporting board for the shocks for guiding them into the vehicle on gravitating from the fingers.

22. In a shock loader for vehicles, an elongated frame structure, hinge connections for supporting said frame at one side of the vehicle for movement to a substantially horizontal position at substantially right angles to the line of travel of the vehicle and to a substantially upright position at the same side of the vehicle, stabbing fingers or tines carried by the frame at the end remote from the hinged end, said stabbing fingers having eye connections at their butt ends with the frame, guides for the fingers inclined both to the length of the frame and to the plane thereof to hold the fingers in the line of travel of the vehicle when the frame is horizontal and to direct them toward a pendent position but at an angle thereto in the direction of the vehicle when the frame is upright, and a yieldable supporting board for the shocks for guiding them into the vehicle on gravitating from the fingers, the frame being provided with a guiding finger at the outer end coacting with the guiding board to direct shocks to the stabbing fingers.

23. In a shock loader for vehicles, an elongated frame pivotally attachable to the vehicle for movement to a substantially horizontal position and to a substantially upright position with relation to the vehicle, said means being provided with stabbing fingers or tines connected to the frame to project therefrom in the direction of the travel of the vehicle when the frame is horizontal and to gravitate toward the pendent position at an inclination thereto and toward the vehicle when the frame is upright, and a yieldable board carried by the frame and projecting in the general line of travel of the vehicle, said board being on the vehicle side of the fingers for supporting a shock while the frame is approaching the upright position and yieldable to the weight of the shock when such upright position has been reached.

24. In a shock loader for vehicles, a shock engaging and elevating frame, pivotal connections for one end of the frame adapted to be secured to the vehicle and about which the frame is movable to a substantially horizontal position and to a substantially upright position with relation to the vehicle on an axis substantially longitudinal to said vehicle, and a latch engaging and holding the frame when in the upright position.

25. In a shock loader for vehicles, a shock engaging and elevating frame, pivotal connections for one end of the frame adapted to be secured to the vehicle and about which the frame is movable to a substantially horizontal position and to a substantially upright position with relation to the vehicle, a latch for holding the frame in the upright position, and means under the control of an operator for actuating the latch to release the frame, the latter having a normal tendency to gravitate to the horizontal position.

26. In a shock loader for vehicles, a shock engaging and elevating means including an elongated frame with one end at an angle to the main body of the frame, a pivotal support for the angle end of the frame attachable to the vehicle and about which the frame is movable to a substantially horizontal position and to a substantially upright position with relation to the vehicle, the angle portion of the frame causing the latter when in the upright position to have a normal tendency to gravitate to the horizontal position, and a latch in the path of the frame to engage and hold it when in the upright position.

27. In a shock loader for vehicles, a shock engaging and elevating means including an elongated frame with one end at an angle to the main body of the frame, a pivotal support for the angle end of the main body of the frame, a pivotal support for the angle end of the frame attachable to the vehicle and about which the frame is movable to a substantially horizontal position and to a substantially upright position with relation to the vehicle, the angle portion of the frame causing the latter when in the upright position to have a normal tendency to gravitate to the horizontal position, a latch in the path of the frame to engage and hold it when in the upright position, and operating means for the latch within reach of an operator.

28. In a shock loader for vehicles, a shock engaging and elevating means including an elongated frame with one end at an angle to the main body of the frame, a pivotal support for the angle end of the main body of the frame, a pivotal support for the angle end of the frame attachable to the vehicle and about which the frame is movable to a substantially horizontal position and to a substantially upright position with relation to the vehicle, the angle portion of the frame causing the latter when in the upright position to have a normal tendency to gravitate to the horizontal position, a latch in the path of the frame to engage and hold it when in the upright position, and operating means for the latch within reach of an operator, said operating means comprising a rock shaft having a foot member engageable by the operator and a rock arm at the end remote from the foot member, and a link connection from the rock arm to the latch for moving the latter to the unlatched position.

29. In a shock loader for vehicles, a frame carrying shock engaging means, a pivotal support for the frame attachable to the vehicle and about which the frame is movable to a substantially horizontal position and to a substantially upright position with relation to the vehicle, the frame having a normal tendency to gravitate to the horizontal position, winding means attachable to a wheel of the vehicle, a clutch member carried by said winding means, a flexible strand extending from the clutch member to the frame and adapted to move the frame to the elevated position when the clutch member is active, and means carried by the frame in position to be engaged by a shock for moving the clutch member to the active position.

30. A shock loader for vehicles comprising a shock engaging and elevating frame, a pivotal support for said frame attachable to a vehicle and about which the frame is movable to a substantially horizontal position and to a substantially upright position with relation to the vehicle, a ring member attachable to a wheel of the vehicle, a winding band carried by the ring member in normally loose relation thereto, a strand connected to the band member and extending to the frame, a clutch carried by the band member in position to engage the ring member, and means carried by the frame in position to be engaged by a shock and provided with connections for causing the actuation of the clutch to active position when said last named means is engaged by a shock.

31. In a shock loader for vehicles, shock engaging and elevating means attachable to the vehicle and means for causing the movement of the shock engaging and elevating means from a substantially horizontal position to a substantially upright position comprising a ring attachable to a wheel of the vehicle, a band in embracing relation to the periphery of the ring and within which the ring is normally free to rotate with the wheel, a clutch or gripper carried by the band in position to engage the ring, a strand carried by the band and connected to the shock engaging and elevating means for lifting the same to the upright position, means for causing the actuation of the gripper to active position by the engagement of a shock with the shock elevating means, a stop member in the path of the gripper for moving it to inactive position at one limit of its travel, and another stop member in the path of return movement of the gripper for determining the limit of such return movement.

32. In a shock loader for vehicles, a shock engaging and elevating means movable to a shock engaging position and to a shock discharging position, and means for causing such movement comprising a ring attachable to a wheel of the vehicle, a band normally loosely mounted upon said ring and within which the ring is normally free to rotate with the wheel, a strand connected to the band and windable thereon, said strand being also connected to the shock engaging and elevating means, a clutch or gripper carried by the band in operative relation to the ring, means for causing the active movement of the gripper to couple the band to the ring on the engagement of a shock with the shock engaging and elevating means, a relatively fixed throw-off stop in the path of the gripper at the completion of its active movement, and another stop adjacent the throw-off stop for arresting return movement of the band.

33. In a shock loader for vehicles, a shock engaging and elevating means movable to a shock engaging position and to a shock discharging position, and means for causing such movement comprising a ring attachable to a wheel of the vehicle, a band normally loosely mounted upon said ring and within which the ring is normally free to rotate with the wheel, a strand connected to the band and windable thereon, said strand being also connected to the shock engaging and elevating means, a clutch or gripper carried by the band in operative relation to the ring, means for causing the active movement of the gripper to couple the band to the ring on the engagement of a shock with the shock engaging and elevating means, a relatively fixed throw-off stop in the path of the gripper at the completion of its active movement, another stop adjacent the throw-off stop for arresting return movement of the band, a latch member for holding the shock engaging and elevating means in the elevated position, and connections between said latch member and the last named stop for moving the said stop out of engaging relation to the band when said latch is actuated.

34. In a shock loader for vehicles, a frame, pivotal connections for one end of the frame attachable to the vehicle, shock stabbing fingers or tines carried by the frame, a latch for holding the frame in a substantially upright position with relation to the vehicle, a ring shaped member attachable to a wheel on the vehicle, a band carried by said ring member in normally loose relation thereto, a clutch or gripper carried by the band in operative relation to the ring, a member carried by the frame in position to be engaged by a shock, a strand connected at one end to the band and at the other to the frame for moving the latter from a substantially horizontal position to the elevated position, a clutch operating member in operative relation thereto when the frame is in the horizontal position, means responsive to engagement with a shock for causing the actuation of the clutch operating member to grip the band to the ring, a relatively fixed throw-off stop in the path of the clutch member, another stop-member normally in the path of the return movement of the band, and connections from the latch member to said last named stop member for moving said stop member out of the path of the band when the latch is actuated.

35. In a shock loading attachment for vehicles, a pivoted frame having shock engaging means and movable to a substantially horizontal position and to a substantially upright position with relation to the vehicle, and means for causing the movement of the frame toward the upright position comprising a ring attachable to a wheel of the vehicle, a band in embracing but normally loose relation to the ring, said band carrying strand guiding means, a strand extending from the band to the frame for elevating the frame when the strand is wound on the band, a clutch or gripper carried by the band in operative relation to the ring, means for causing the active engagement of the clutch with the ring to wind the strand thereon, and means for causing the disengagement of the clutch or gripper from the band when the frame has reached the upright position.

36. In a shock loader for vehicles, a shock engaging and elevating means movable from a substantially horizontal to a substantially upright position with relation to the vehicle, and means for causing the movement of the shock engaging and elevating means to the upright position by the progressive movement of the vehicle comprising a ring attachable to a wheel of the vehicle to rotate therewith, a band in embracing but normally loose relation to the ring and provided with strand guiding means, a strand connected at one end to the band and at the other end to the shock engaging and elevating means, a clutch or gripper carried by the band in operative relation to the ring, means for causing the engagement of the gripper with the band, and throw-off means for actuating the gripper to inactive position when the shock engaging and elevating means is in the upright position.

37. In a shock loader for vehicles, a shock engaging and elevating means movable to a substantially horizontal position and to a substantially upright position, and means for causing movement of the shock engaging and elevating means to the upright position by the progressive movement of the vehicle comprising a ring attachable to a wheel of the vehicle for rotation therewith, a band in embracing but normally loose relation to the ring, a clutch or gripper connected to the band and in operative relation to the ring, clutch operating means in position to actuate the clutch when the shock engaging and elevating means is in the substantially horizontal position, a throw-off for the clutch operative thereto when the shock engaging and elevating means is in the upright position, and a flexible strand connected at one end to the band and at the other end to the shock engaging and elevating means and adapted to be wound on the band by the rotative movement of the wheel to elevate said shock engaging and elevating means to the upright position.

38. In a shock loader for vehicles, means for engaging and elevating the shock, and means for operating said first named means to elevate the shock comprising a ring attachable to a wheel of the vehicle, a band in embracing but normally loose relation to the ring, a clutch or gripper carried by the band in operative relation to the ring, a stop member for limiting the movement of the band in one direction, a throw-off stop member for the clutch or gripper at the limit of movement of the band in the other direction, and an intermediate stop member for arresting return movement of the band and located adjacent the throw-off stop member.

39. In a shock loader for vehicles, a shock engaging and elevating means, and means for operating the shock loading and elevating means to elevate a shock comprising a ring attachable to a vehicle wheel to rotate therewith, a band carried by the ring provided with anti-friction members in embracing relation to the ring to hold the band loosely to the ring, said band being also provided with strand guiding means, a clutch or gripper carried by one end of the band in operative relation to the ring, a strand connected to the end of the band carrying the gripper and extending to the shock engaging and elevating means, a relatively fixed stop member in the path of the band at one limit of its travel about the ring, a throw-off stop member in the path of the gripper at the termination of its active travel, and another stop member in the path of the band adjacent the limit of its active movement for arresting return movement of the band.

40. In a shock loader for vehicles, a shock engaging and elevating means, and means for operating the shock loading and elevating means to elevate a shock comprising a ring attachable to a vehicle wheel to rotate therewith, a band carried by the ring provided with anti-friction members in embracing relation to the ring to hold the band loosely to the ring, said band being also provided with strand guiding means, a clutch or gripper carried by one end of the band in operative relation to the ring, a strand connected to the end of the band carrying the gripper and extending to the shock engaging and elevating means, a relatively fixed stop member in the path of the band at one limit of its travel about the ring, a throw-off stop member in the path of the gripper at the termination of its active travel, another stop member in the path of the band adjacent the limit of its active movement for arresting return movement of the band, and means for actuating the last named stop member to move out of the path of the band.

41. In a shock loader for vehicles, a shock engaging and elevating means movable from a substantially horizontal position to a substantially upright position to elevate the shock, and means for causing the movement of the shock engaging and elevating means to the upright position comprising a ring attachable to a wheel of the vehicle to rotate therewith, a band in encircling but normally loose relation to the ring, a clutch or gripper at one end of the band in operative relation to the ring, a strand connected to the band for winding thereon and extending to the shock engaging and elevating means, a stop member carried by the band, another stop member carried by the gripper, a relatively fixed stop member in the path of the stop member of the band at the limit of its inactive travel, a throw-off stop member in the path of the stop member on the gripper to cause the disconnection of the gripper from the band at the limit of the active travel of the band, guiding means on the band for the strand, an operating member for the gripper in operative relation thereto when the stop member of the band is in engagement with the first named relatively fixed stop member, and another stop member in the path of the stop member of the band adjacent the throw-off stop member and movable into and out of the path of the stop member of the band.

42. In a shock loader for vehicles, a shock engaging and elevating means carried by the vehicle and movable from a substantially horizontal position to substantially upright position with relation to the vehicle, and means for moving the shock engaging and elevating means to the upright position comprising a ring attachable to a wheel of the vehicle to rotate therewith, a band in embracing but normally loose relation to the ring, a strand connected to the band and to the shock engaging and elevating means for winding of the band to move the shock engaging and elevating means to the upright position, clutching means for coupling the band to the ring, and means for holding the band to the ring comprising oppositely disposed strips each pivotally connected at one end to the band and at the other end provided with extensions carrying rollers in embracing relation to the ring, and a coupling web normally holding the strips with the rollers in embracing relation to the ring.

43. In a shock loader for vehicles, a shock engaging and elevating means carried by the vehicle and movable from a substantially horizontal position to substantially upright position with relation to the vehicle, and means for moving the shock engaging and elevating means to the upright position comprising a ring attachable to a wheel of the vehicle to rotate therewith, a band in embracing but normally loose relation to the ring, a strand connected to the band and to the shock engaging and elevating means for winding of the band to move the shock engaging and elevating means to the upright position, clutching means for coupling the band to the ring, and means for holding the band to the ring comprising oppositely disposed strips each pivotally connected at one end to the band and at the other end provided with extensions carrying rollers in embracing relation to the ring, and a coupling web normally holding the strips with the rollers in embracing relation to the ring, said strips also being provided with outstanding members constituting guides for the strand.

44. In a shock loading attachment for vehicles, a shock engaging and elevating means movable from a substantially horizontal position to a substantially upright position with relation to the vehicle, and means for causing the movement of said first named means to the upright position comprising a ring attachable to a wheel of the vehicle for rotating therewith, a band in embracing but normally loose relation to the ring, a strand connected to the band and extending to the first named means for winding on the band to move the first named means to the upright position, a clutch or gripper for coupling the band to the ring, means for actuating the gripper to gripping position, and throw-off means for the gripper, said gripper comprising two members in embracing relation to the ring, one member being fast to the band and both members being pivoted together at points remote from their points of engagement with the ring, said gripper members being provided with elastic means for urging them and constraining them toward inactive position with relation to the ring.

45. In a shock loading attachment for vehicles, a shock engaging and elevating means movable from a substantially horizontal position to a substantially upright position with relation to the vehicle, a strand connected to said means, a winding means for the strand attachable to a wheel of the vehicle, a clutch or gripper carried by said winding means for coupling the latter to the wheel of the vehicle, and means for operating the clutch comprising a slidable member having a normal tendency in a direction to cause the coupling movement of the clutch, a lock member for holding the slidable member against its normal tendency, and means carried by the shock engaging and elevating means and connected to the lock means for the slidable member, said means connected to the lock means being located to be engaged by a shock when the shock engaging and elevating means is in the substantially horizontal position.

46. In a shock loader for vehicles, a shock engaging and elevating means movable to a substantially horizontal position to engage a shock and to a substantially upright position to elevate and discharge shocks, a wheel actuated member coupled to the shock engaging and elevating means for causing the movement of the latter to the upright position, said wheel actuated member being in normally inactive relation to rotative movement of the wheel, a clutch or gripper for coupling the wheel actuated member to the wheel for movement thereby, means for causing the actuation of the clutch or gripper, a slidable member for actuating said gripper operating means and having a normal tendency to move actively, a lock member for holding said slidable member in the inactive position against its normal tendency, and means carried by the shock engaging and elevating means for causing a movement of the lock member to release the slidable member to its normal tendency.

47. In a shock loader for vehicles, a shock engaging and elevating means movable to a substantially horizontal position to engage a shock and to a substantially upright position to elevate and discharge shocks, a wheel actuated member coupled to the shock engaging and elevating means for causing the movement of the latter to the upright position, said wheel actuated member being in normally inactive relation to rotative movement of the wheel, a clutch or gripper for coupling the wheel actuated member to the wheel for movement thereby, means for causing the actuation of the clutch or gripper, a slidable member for actuating said gripper operating means and having a normal tendency to move actively, a lock member for holding said slidable member in the inactive position against its normal tendency, means carried by the shock engaging and elevating means for causing a movement of the lock member to release the slidable member to its normal tendency, and a return mechanism for the slidable member to move the same against its normal tendency in position to be again locked comprising a lever in the path of the shock engaging and elevating means when approaching the termination of its movement toward the elevated position.

48. In a shock loader for vehicles, a shock engaging and elevating means movable to a substantially horizontal position to engage a shock and to a substantially upright position to elevate and discharge shocks, a wheel actuated member coupled to the shock engaging and elevating means for causing the movement of the latter to the upright position, said wheel actuated member being in normally inactive relation to rotative movement of the wheel, a clutch or gripper for coupling the wheel actuated member to the wheel for movement thereby, means for causing the actuation of the clutch or gripper, a slidable member for actuating said gripper operating means and having a normal tendency to move actively, a lock member for holding said slidable member in the inactive position against its normal tendency, means carried by the shock engaging and elevating means for causing a movement of the lock member to release the slidable member to its normal tendency, and means accessible to an operator for actuating the lock member to release the slidable member independently of the shock operated means.

49. In a shock loader for vehicles, a shock engaging and elevating means movable to a substantially horizontal position to engage a shock and to a substantially upright position to elevate and discharge shocks, a wheel actuated member coupled to the shock engaging and elevating means for causing the movement of the latter to the upright position, said wheel actuated member being in normally inactive relation to rotative movement of the wheel, a clutch or gripper for coupling the wheel actuated member to the wheel for movement thereby, means for causing the actuation of the clutch or gripper, a slidable member for actuating said gripper operating means and having a normal tendency to move actively, a lock member for holding said slidable member in the inactive position against its normal tendency, and means carried by the shock engaging and elevating means for causing a movement of the lock member to release the slidable member to its normal tendency, and means accessible to an operator for actuating the lock member to release the slidable member independently of the shock operated means, said means comprising a rock shaft, a rock arm at one end thereof in position to engage the lock member, and connections from the other end of the rock shaft and located at the front of the vehicle within reach of the operator.

50. In a shock loader for vehicles, a shock engaging and elevating means movable to a substantially horizontal position to engage a shock and to a substantially upright position to elevate and discharge shocks, a wheel actuated member coupled to the shock engaging and elevating means for causing the movement of the latter to the upright position, said wheel actuated member being in normally inactive relation to rotative movement of the wheel, a clutch or gripper for coupling the wheel actuated member to the wheel for movement thereby, means for causing the actuation of the clutch or gripper, a slidable member for actuating said gripper operating means and having a normal tendency to move actively, a lock member for holding said slidable member in the inactive position against its normal tendency, means carried by the shock engaging and elevating means for causing a movement of the lock member to release the slidable member to its normal tendency, and a return mechanism for the slidable member to move the same against its normal tendency in position to be again locked comprising a lever in the path of the shock engaging and elevating means when approaching the termination of its movement toward the elevated position, and means for the manual operation of the lock member independently of the shock operated means therefor.

In testimony, that I claim the foregoing as my own, I have hereto affixed my signature in the presence of two witnesses.

DAVID M. MYERS.

Witnesses:
JOHN H. SIGGERS,
EDITH L. BROWN.

---

Copies of this patent may be obtained for five cents each, by addressing the "Commissioner of Patents, Washington, D. C."